(12) United States Patent
Lambert

(10) Patent No.: US 9,571,370 B2
(45) Date of Patent: Feb. 14, 2017

(54) WIRELESS MESH NETWORK USAGE REPORTING SYSTEM AND METHOD

(71) Applicant: Adtran, Inc., Huntsville, AL (US)

(72) Inventor: Rebecca Kay Lambert, Arlington, MA (US)

(73) Assignee: Adtran, Inc., Huntsville, AL (US)

( * ) Notice: Subject to any disclaimer, the term of this patent is extended or adjusted under 35 U.S.C. 154(b) by 109 days.

(21) Appl. No.: 14/523,877

(22) Filed: Oct. 25, 2014

(65) Prior Publication Data

US 2016/0119803 A1  Apr. 28, 2016

(51) Int. Cl.

| G06F 11/00 | (2006.01) |
| --- | --- |
| H04J 1/16 | (2006.01) |
| H04L 1/00 | (2006.01) |
| H04L 12/26 | (2006.01) |
| H04W 84/18 | (2009.01) |
| H04W 24/10 | (2009.01) |

(52) U.S. Cl.
CPC ......... H04L 43/0876 (2013.01); H04L 43/062 (2013.01); H04L 43/0894 (2013.01); H04W 24/10 (2013.01); H04W 84/18 (2013.01)

(58) Field of Classification Search
CPC ............. H04L 43/0876; H04L 43/0894; H04L 43/062; H04W 24/10; H04W 84/18
USPC .......................................... 370/252, 253, 254
See application file for complete search history.

(56) References Cited

U.S. PATENT DOCUMENTS

| 8,270,382 B2* | 9/2012 | Cam-Winget | ........ H04L 63/162 370/338 |
| --- | --- | --- | --- |
| 8,305,996 B2* | 11/2012 | Rahman | ................ H04W 8/005 370/328 |
| 8,818,458 B2* | 8/2014 | Rahm | ...................... H01Q 3/26 343/751 |
| 9,173,111 B2* | 10/2015 | Pace | ...................... H04W 40/00 |
| 2006/0120387 A1* | 6/2006 | Yang | ....................... H04L 45/04 370/401 |
| 2007/0019598 A1* | 1/2007 | Prehofer | ........... H04W 36/0055 370/338 |
| 2007/0153702 A1* | 7/2007 | Khan Alicherry | .. H04W 72/082 370/252 |
| 2007/0206537 A1* | 9/2007 | Cam-Winget | ........ H04L 63/162 370/331 |
| 2008/0043637 A1* | 2/2008 | Rahman | .................. H04L 45/22 370/254 |
| 2011/0164562 A1* | 7/2011 | Qiu | ................... H04W 72/1236 370/328 |
| 2011/0264915 A1* | 10/2011 | Cam-Winget | ........ H04L 63/162 713/171 |
| 2012/0099457 A1* | 4/2012 | Roy | ....................... H04W 24/00 370/252 |
| 2012/0294229 A1* | 11/2012 | Saito | .................... H04W 72/082 370/315 |
| 2013/0170335 A1* | 7/2013 | Pace | ..................... H04W 40/00 370/218 |

(Continued)

Primary Examiner — Chuong T Ho
(74) Attorney, Agent, or Firm — Smith Tempel Blaha LLC; Michael J. Tempel

(57) ABSTRACT

For each traffic flow through a wireless mesh network, the most upstream wireless access point through which that traffic flow is communicated is determined. An indication of the traffic flow through the most upstream wireless mesh access point is output in a report or otherwise provided. The reported traffic flows can be summed to provide total traffic flow indications for the wireless mesh network.

18 Claims, 6 Drawing Sheets

(56) References Cited

U.S. PATENT DOCUMENTS

| | | | |
|---|---|---|---|
| 2014/0089912 A1* | 3/2014 | Wang | G06F 8/65 717/173 |
| 2014/0122500 A1* | 5/2014 | Burkard | G06F 17/30864 707/748 |
| 2015/0172986 A1* | 6/2015 | Salkintzis | H04W 36/22 455/436 |
| 2016/0050570 A1* | 2/2016 | Pace | H04W 40/00 370/238 |

* cited by examiner

| AP NAME | INCOMING MESH TRAFFIC | OUTGOING MESH TRAFFIC | INCOMING CLIENT TRAFFIC | OUTGOING CLIENT TRAFFIC |
|---|---|---|---|---|
| Portal AP 12 | (1ST FLOW) | (2ND FLOW) | 0 | 0 |
| Mesh AP 14 | 0 | 0 | (1ST FLOW) | 0 |
| Mesh AP 16 | (3RD FLOW) | (3RD FLOW) | 0 | (3RD FLOW) |
| Mesh AP 18 | 0 | 0 | (3RD FLOW) | (2ND FLOW) |
| Total for Network: | (1ST FLOW + 3RD FLOW) | (2ND FLOW + 3RD FLOW) | | |

FIG. 5

WIRELESS MESH NETWORK USAGE REPORTING SYSTEM AND METHOD

BACKGROUND

A network administrator is a person responsible for the maintenance of the hardware and software systems that define a computer network. Among other tasks, a network administrator monitors network usage or traffic. The term "traffic" is commonly used to refer to network communications over a network link. Traffic can be measured in units of data per unit of time, such as bits per second, frames per second, etc. Each traffic flow through a network can be characterized by such a measurement.

A wireless network is a computer network that allows a wireless network device to communicate with or access a computer network via a radio communication link. For a number of years, the most common type of wireless network has been that which is commonly referred to as "WiFi" or "802.11," the latter term in reference to the IEEE 802.11 set of standards that govern such networks. Such an 802.11 network comprises one or more access points (APs) that are each connected by a wired connection with a router or similar networking device. A client device, such as a portable computer, smartphone, etc., can communicate by radio communication link, i.e., wirelessly, with the AP. The router or other such networking device allows the client device to communicate with or access a computer network. It is common for the networking device to provide the client device with a connection to the Internet.

A network administrator may desire to monitor the usage of one or more wireless APs. For example, a network administrator may desire to determine which of several APs that are connected by wired connections with the router uses the most bandwidth. As each wired connection can communicate one traffic flow between an AP and the router, it is a straightforward matter to measure each traffic flow.

A wireless mesh network is a digital communications network comprising APs organized in a mesh topology, where each AP can communicate via radio communication links in a peer-to-peer manner with other such APs in the network. Each AP is configured to be capable of receiving a communication from another (peer) AP and forwarding or relaying the message to still another (peer) AP. The communication reaches its ultimate destination via one or more such relays or "hops" as they are commonly referred to in the art. In a client-server computing system, the source and destination of a communication is generally a client device or a server device. Wireless mesh networks can employ radio technology and protocols that are similar to those employed in non-mesh wireless networks, such as those governed by IEEE 802.11. A set of standards known as IEEE 802.11s relates more specifically to wireless mesh networks and is an extension of the IEEE 802.11 set of standards.

A subset of the wireless mesh APs in a network may also be wireless mesh portal APs. A wireless mesh portal AP not only can communicate via wireless communication links with peers in the same manner as other wireless mesh APs in the network but also can communicate via wired connections with network controllers or gateways to other networks, such as the Internet. A first wireless mesh AP can be referred to as an "uplink" of a second wireless mesh AP if the first wireless mesh AP can receive wireless traffic from the second wireless mesh AP directly, with no intermediate hops. In a wireless mesh network having a tree structure, each wireless mesh AP has at most one uplink.

Monitoring traffic flow in a wireless mesh network in a meaningful way can present challenges. For example, in a wireless mesh network, bandwidth of a traffic flow is halved for each hop. It would be desirable to provide a system and method that addresses such challenges.

SUMMARY

Embodiments of the invention relate to a system, method, and computer program product for reporting wireless mesh network traffic. In an exemplary embodiment, for each traffic flow through the network, the most upstream wireless access point through which that traffic flow is communicated is determined. An indication of the traffic flow through the most upstream wireless mesh AP is provided. In the exemplary embodiment, measurements can be summed to provide total measurements for the wireless mesh network.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 5 is an example of a report that the controller device of FIG. 1 can generate.

DETAILED DESCRIPTION

Figure 1:
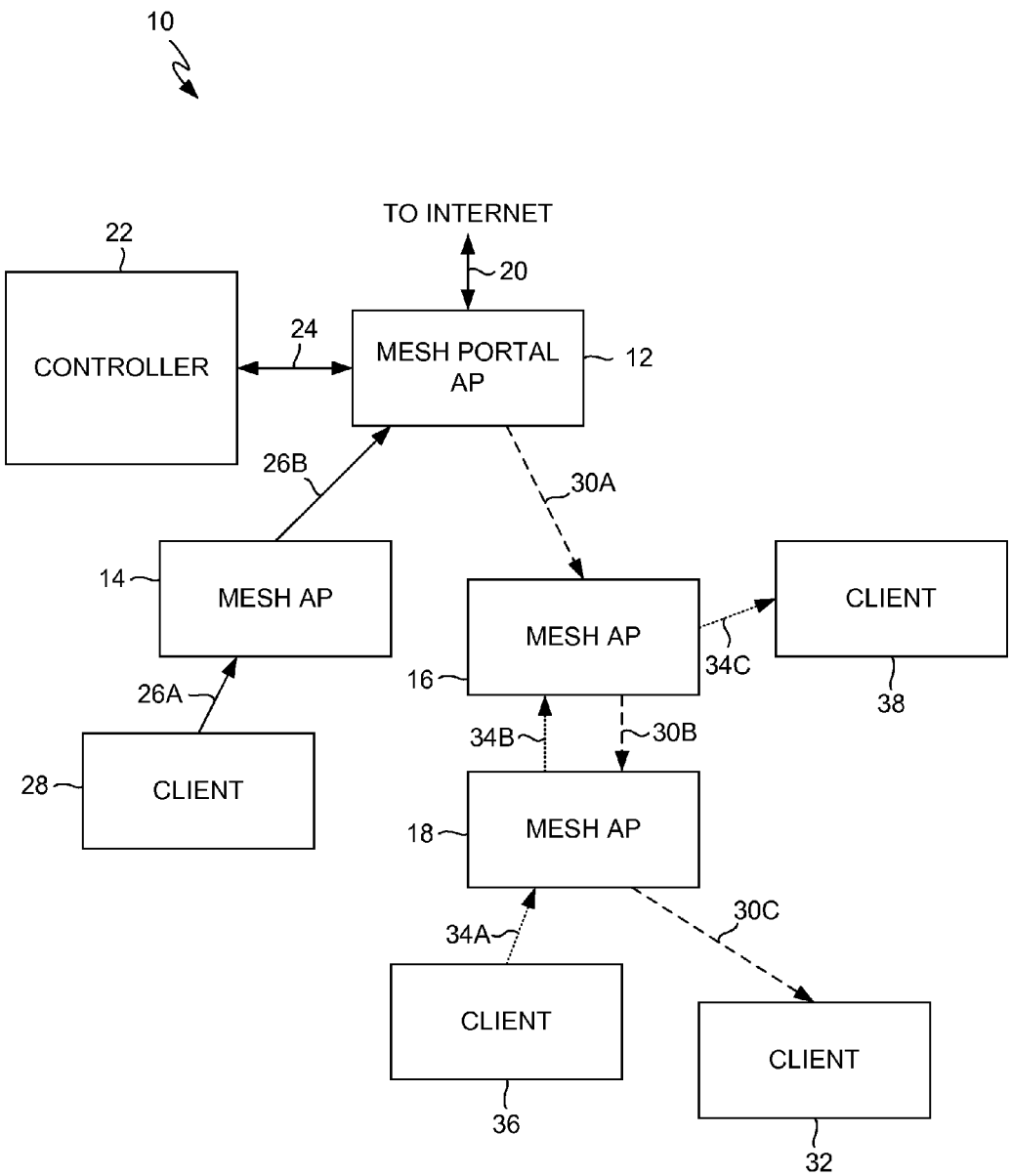
FIG. 1 is a block diagram of an exemplary wireless mesh network.

As illustrated in FIG. 1, in an illustrative or exemplary embodiment of the invention, a wireless mesh network 10 includes a plurality of wireless mesh access points (APs) 12, 14, 16 and 18. Wireless mesh AP 12 is a wireless mesh portal AP that serves as a gateway to another network, such as the Internet, via a wired link 20. A controller 22 is connected to wireless mesh portal AP 12 via another wired link 24. Controller 22 thus can communicate with any selected one of APs 12-18. Although for illustrative purposes in the exemplary embodiment only these four APs 12-18 are shown, in other embodiments other such wireless mesh networks can have any number of such APs. As well understood by persons skilled in the art, the exemplary APs 12-18 are arranged in a mesh topology. That is, each of APs 12-18 can communicate via a wireless communication link with at least one other of APs 12-18. (In FIG. 1, the wireless communication links are represented by lines interconnecting APs 12-18.) The spatial arrangement of APs 12-18 shown in FIG. 1 is intended merely to be illustrative or exemplary, as each of APs 12-18 can be located in any suitable position relative to the others. Those of APs 12-18 that can establish wireless communication links with each other are referred to as peers. As the manner in which APs 12-18 can establish and communicate with each other via wireless communication links is well understood by persons skilled in the art, this aspect is not described herein. Similarly, as the manner in which each of APs 12-18 can receive a communication from a peer and relay or forward the message to another peer is well understood by persons skilled in the art, this aspect is not described herein.

In FIG. 1 exemplary flows of communications, i.e., traffic, are indicated by arrows. For example, a first exemplary traffic flow is represented by each of arrows 26A and 26B (shown in solid line). Arrow 26A represents a traffic flow outgoing from a client device 28 and incoming to AP 14, while arrow 26B represents the same traffic flow outgoing from AP 14 and incoming to AP 12. A second exemplary traffic flow is represented by each of arrows 30A, 30B and 30C (shown in coarse broken line to help distinguish from the first traffic flow). Arrow 30A represents a traffic flow outgoing from AP 12 and incoming to AP 16; arrow 30B represents the same traffic flow outgoing from AP 16 and incoming to AP 18; and arrow 30C represents the same traffic flow outgoing from AP 18 and incoming to a client device 32. A third exemplary traffic flow is represented by each of arrows 34A, 34B and 34C (shown in fine broken line to help distinguish from the second traffic flow). Arrow 34A represents a traffic flow outgoing from a client device 36 and incoming to AP 18; arrow 34B represents the same traffic flow outgoing from AP 18 and incoming to AP 16; and arrow 34C represents the same traffic flow outgoing from AP 16 and incoming to a client device 38. The term "traffic flow" in each of these exemplary instances refers to a set or stream of data packets that define the information communicated. Note that each traffic flow is characterized by an amount of data per unit time. Although traffic flows may change over time, the exemplary embodiment relates to providing a snapshot of traffic flows over a time interval. For example, a traffic flow may be characterized by a number of bits, frames, or other data units measured over a number of seconds.

In measuring traffic for purposes of, for example, reporting to a system administrator, only the unique traffic flows, such as, for example, the three exemplary traffic flows shown in FIG. 1, are considered. To limit consideration to only the unique traffic flows, the exemplary method determines or identifies the most upstream wireless mesh AP for each traffic flow. The term "upstream" refers to relative position of one network device with respect to another within a path through the network. A first AP is upstream of a second AP if the path connecting the second AP to the mesh portal AP passes through the first AP. As an exemplary wireless mesh network to which the present disclosure relates, such as wireless mesh network 10, is limited to a tree structure, there is mathematically guaranteed to be exactly one path between any two APs. This means that any traffic passing from one AP to the other must be either upstream or downstream. For example, in FIG. 1 portal AP 12 is the most upstream AP in the first exemplary traffic flow (represented by arrows 26A and 26B). Similarly, portal AP 12 is the most upstream AP in the second exemplary traffic flow (represented by arrows 30A, 30B and 30C). Likewise, AP 16 is the most upstream AP in the third exemplary traffic flow (represented by arrows 34A, 34B and 34C).

In accordance with the exemplary method described below with regard to FIGS. 2A-2B, information indicating wireless mesh network usage (i.e., traffic) can be computed and output (i.e., reported) so that, for example, a network administrator can review the information. The report can distinguish between mesh traffic and client traffic. The term "mesh traffic" is used herein to refer to traffic that is communicated via a direct communication link from one AP to a peer AP. In the exemplary embodiment described herein, total incoming mesh traffic for the network and total outgoing mesh traffic for the network are determined and reported. In the exemplary embodiment, incoming and outgoing client traffic for each AP having such traffic are also determined and reported. The term "client traffic" is used herein to refer to traffic that is communicated via a direct communication link between an AP and a client device, such as a laptop or portable computer, smartphone, tablet computer, etc. As described below in further detail, the total incoming mesh traffic is computed by summing the incoming mesh traffic for each AP that is the most upstream AP in a traffic flow. Likewise, the total outgoing mesh traffic is computed by summing the outgoing mesh traffic for each AP that is the most upstream AP in a traffic flow. Controller 22 or another network device can serve a user interface through which a system administrator or other user can make selections from a menu of different items of wireless mesh network usage information, and the system computes and reports the selected items.

Figure 2A:
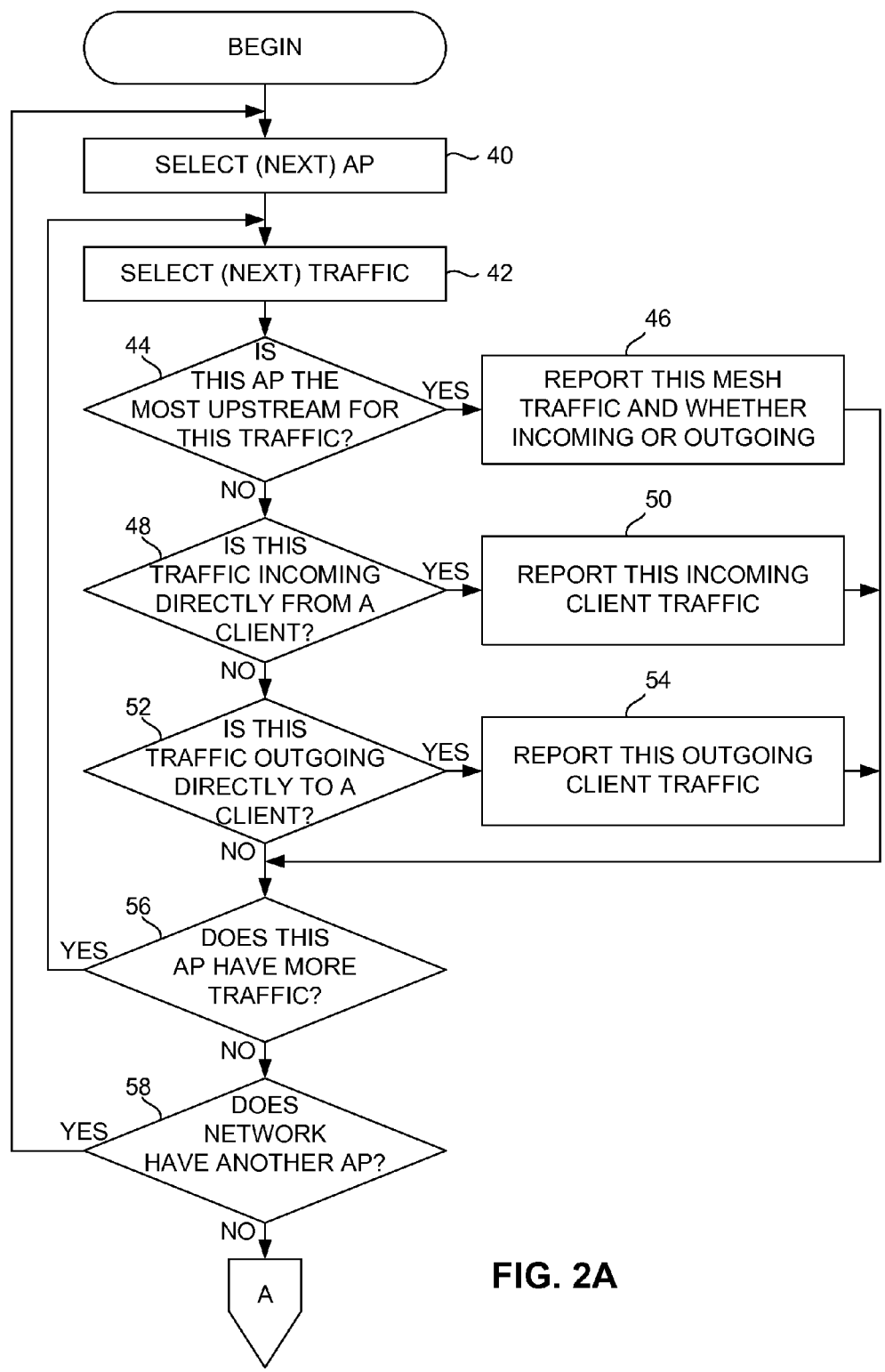
FIG. 2A is a flow diagram illustrating an exemplary method for measuring and reporting traffic in the wireless mesh network of FIG. 1.

As illustrated in FIG. 2A, the exemplary method begins as indicated by block 40. Controller 22 can selectively poll each AP in the wireless mesh network. As indicated by block 42, the selected AP can selectively examine each of its traffic flows, either in response to being polled or, alternatively, in advance of being polled. As a conventional wireless mesh AP is capable of measuring incoming and outgoing traffic flows and providing such measurement information, the manner in which such an AP measures and provides such information is not described herein. Each of the selected AP's traffic flows is selected in turn.

As indicated by block 44, a selected AP can determine whether it is the most upstream AP in the selected traffic flow. As each AP stores an indication of the identity of the upstream device with which it has a direct communication link in the path for each of its traffic flows, the AP readily can determine whether there is another AP upstream of it in a traffic flow.

As indicated by block 46, if it is determined (block 44) that the selected AP is the most upstream AP in the selected traffic flow, then the selected traffic flow is reported (e.g., provided as user-perceptible output via a user interface). For example, the selected AP can transmit a measurement of a traffic flow to controller 22 in response to being polled. The selected AP can also identify whether each traffic flow is incoming to it or outgoing from it.

If the selected traffic flow is incoming to a selected AP that is the most upstream AP in the selected traffic flow, then the report (block 46) identifies the selected traffic flow as incoming mesh traffic. If the selected traffic flow is outgoing from a selected AP that is the most upstream AP in the selected traffic flow, then the report (block 46) identifies the selected traffic flow as outgoing mesh traffic. Thus, as described below in further detail, a result of the exemplary method having selected each AP in the network is a report that identifies each AP and any associated incoming and outgoing mesh traffic substantially at the time the method was performed. The method can be performed, and such a report can be generated, at any suitable times.

As indicated by block 48, it is determined whether the selected traffic flow at the selected AP is incoming from a client device. A client device from which a traffic flow is incoming to the selected AP is referred to as being located "downstream" of the selected AP. It can be determined whether the selected traffic flow at the selected AP is incoming from a client device as opposed to some other type of network device by comparing the Organizationally Unique Identifier (OUI) bits of a media access control (MAC) address of the selected AP with the OUI bits of the MAC address of the downstream device in the selected traffic flow. A match between the OUI bits of the selected AP and the downstream device in the traffic flow indicates that the downstream device is another AP. A mismatch between the OUI bits of the selected AP and the downstream device indicates that the downstream device is not an AP but rather is a client device (e.g., computer, smartphone, etc.). As indicated by block 50, if it is determined (block 48) that the incoming traffic flow is from a client device, then the selected traffic flow is reported and identified as incoming client traffic to the selected AP.

As indicated by block 52, it is determined whether the selected traffic flow at the selected AP is outgoing to a client device. It can be determined whether the selected traffic flow at the selected AP is outgoing to a client device in the same manner described above, i.e., by comparing the OUI bits of the selected AP with the OUI bits of the downstream device in the selected traffic flow. As indicated by block 54, if it is determined (block 52) that the outgoing traffic flow is outgoing from the selected AP to a client device, then the selected traffic flow is reported and identified as outgoing client traffic from the selected AP.

As indicated by blocks 56 and 58, the exemplary method as described above is performed for each traffic flow at each AP in the wireless mesh network.

Figure 2B:
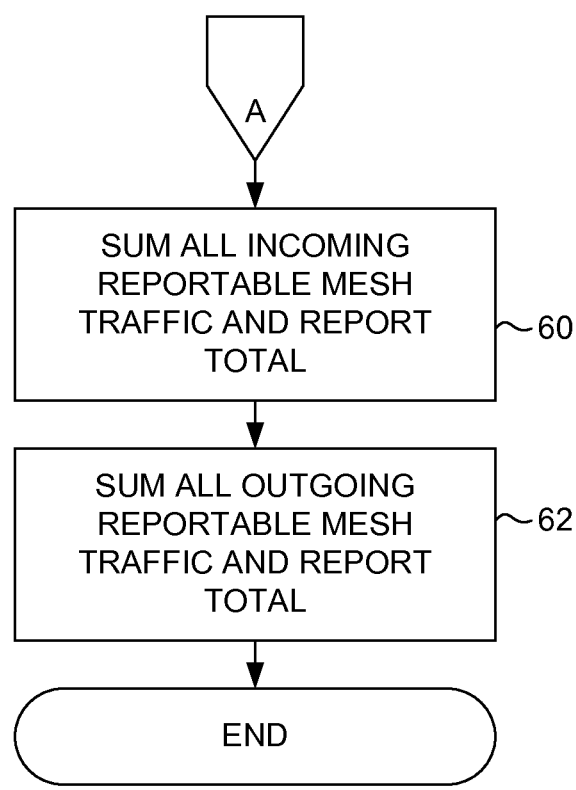
FIG. 2B is a continuation of the flow diagram of FIG. 2A.

As illustrated in FIG. 2B, the exemplary method can continue as indicated by blocks 60 and 62. As indicated by block 60, total incoming mesh traffic is calculated by summing each incoming mesh traffic flow that was reported in accordance with above-described block 46. Likewise, as indicated by block 62, total outgoing mesh traffic is calculated by summing each outgoing mesh traffic flow that was reported in accordance with above-described block 46. The following example of the above-described method uses the exemplary wireless mesh network 10 shown in FIG. 1.

In FIG. 1, the first traffic flow is outgoing from AP 14 to portal AP 12, as indicated by arrow 26B. The method described above with regard to FIGS. 2A-2B determines (block 44) that AP 14 is not the most upstream AP for the first traffic flow because AP 12 is upstream of AP 14 (i.e., AP 12 serves as the uplink device for AP 14). The outgoing traffic flow (indicated by arrow 26B) from AP 14 is mesh traffic because it is directly communicated from AP 14 to portal AP 12. In the exemplary embodiment mesh traffic is not reported with respect to a selected AP unless the selected AP is the most upstream AP in the traffic flow. Accordingly, the outgoing first traffic flow from AP 14 (indicated by arrow 26B) is not reported. However, in the exemplary embodiment all client traffic is reported. The method determines (block 48) that the incoming first traffic flow (indicated by arrow 26A) is incoming client traffic to AP 14. Accordingly, the first traffic flow at AP 14 is reported (block 50) and identified as incoming client traffic to AP 14.

The method determines (block 44) that portal AP 12 is the most upstream AP for the first traffic flow because a portal AP is inherently the most upstream AP for its incoming traffic flows. The incoming first traffic flow (indicated by arrow 26B) at AP 12 is reported (block 46) and identified as incoming mesh traffic to portal AP 12.

The method also determines (block 44) that portal AP 12 is the most upstream AP for the second traffic flow because a portal AP is inherently the most upstream AP for its outgoing traffic flows. The outgoing second traffic flow (indicated by arrow 30A) at AP 12 is reported (block 46) as outgoing mesh traffic from portal AP 12.

The incoming second traffic flow (indicated by arrow 30A) at AP 16 is mesh traffic but is determined (block 44) to be not reportable because AP 16 is not the most upstream AP for the second traffic flow. The outgoing second traffic flow (indicated by arrow 30B) at AP 16 is mesh traffic but is determined (block 44) to be not reportable because AP 16 is not the most upstream AP for the second traffic flow. Accordingly, neither the incoming second traffic flow (indicated by arrow 30A) at AP 16 nor the outgoing second traffic flow (indicated by arrow 30B) at AP 16 are reported.

The incoming third traffic flow (indicated by arrow 34B) at AP 16 is mesh traffic and is determined (block 44) to be reportable because AP 16 is the most upstream AP for the third traffic flow. The incoming third traffic flow (indicated by arrow 34B) at AP 16 is therefore reported (block 46) as incoming mesh traffic to AP 16. In addition, the method determines (block 52) that the outgoing third traffic flow (indicated by arrow 34C) is outgoing client traffic from AP 16. Accordingly, the third traffic flow at AP 16 is also reported (block 54) as outgoing client traffic from AP 16.

The incoming second traffic flow (indicated by arrow 30B) at AP 18 is mesh traffic, but it is determined (block 44) to be not reportable because AP 18 is not the most upstream AP for the second traffic flow. (Rather, as described above, portal AP 12 is the most upstream AP for the second traffic flow.) Accordingly, the incoming second traffic flow to AP 18 is not reported.

It is determined (block 52) that the outgoing second traffic flow (indicated by arrow 30C) at AP 18 is client traffic because the second traffic flow is outgoing from AP 18 to client device 32. Accordingly, the second traffic flow is reported (block 54) as outgoing client traffic from AP 18.

It is also determined (block 48) that the incoming third traffic flow (indicated by arrow 34A) at AP 18 is client traffic because the third traffic flow is incoming to AP 18 from client device 36. Accordingly, the third traffic flow is reported (block 50) as incoming client traffic to AP 18.

The outgoing third traffic flow (indicated by arrow 34B) at AP 18 is mesh traffic, but it is determined (block 44) to be not reportable with respect to AP 18 because AP 18 is not the most upstream AP for the third traffic flow. (Rather, as described above, AP 16 is the most upstream AP for the third traffic flow.)

In accordance with block 60 of the method, the above-referenced reported incoming mesh traffic is summed Thus, the first traffic flow that was reported as incoming mesh traffic to AP 12 and the incoming third traffic flow that was reported as incoming mesh traffic to AP 16 are added together or summed. The result of this addition or summation computation is the total incoming mesh traffic for wireless mesh network 10 in the operational state in which it is shown in FIG. 1. This total outgoing mesh traffic is reported.

In accordance with block 62 of the method, the reported outgoing mesh is summed Thus, second traffic flow that was reported as outgoing mesh traffic from AP 12 and the third traffic flow that was reported as outgoing mesh traffic from AP 16 are added together or summed. The result of this addition or summation computation is the total outgoing mesh traffic for wireless mesh network 10 in the operational state in which it is shown in FIG. 1. This total outgoing mesh traffic is also reported.

It should be understood that the method described above is not intended to represent the entirety of the operation of each of APs 12-18, network 10 or any portion thereof. Rather, the method described above represents only those operational aspects that are most directly related to the exemplary embodiment of the invention. Other operational aspects of each of APs 12-18, such as those that are conventional, may not be described herein, as they are well understood by persons skilled in the art. Except as otherwise stated herein, each of APs 12-18 operates not only in the manner described above but also in a conventional manner. Thus, for example, each of APs 12-18 is configured to establish and maintain wireless communication links with each other in a manner that enables communication of the above-described exemplary traffic flows.

Controller 22 and each of APs 12-18 are configured to effectuate the exemplary method described above with regard to FIGS. 2A-2B or a portion thereof. In view of the foregoing descriptions of the exemplary method and the following descriptions of controller 22 and an exemplary AP 82 (FIG. 4), persons skilled in the art will be capable of providing suitable logic and otherwise configuring controller 22 and APs 12-18.

Figure 3:
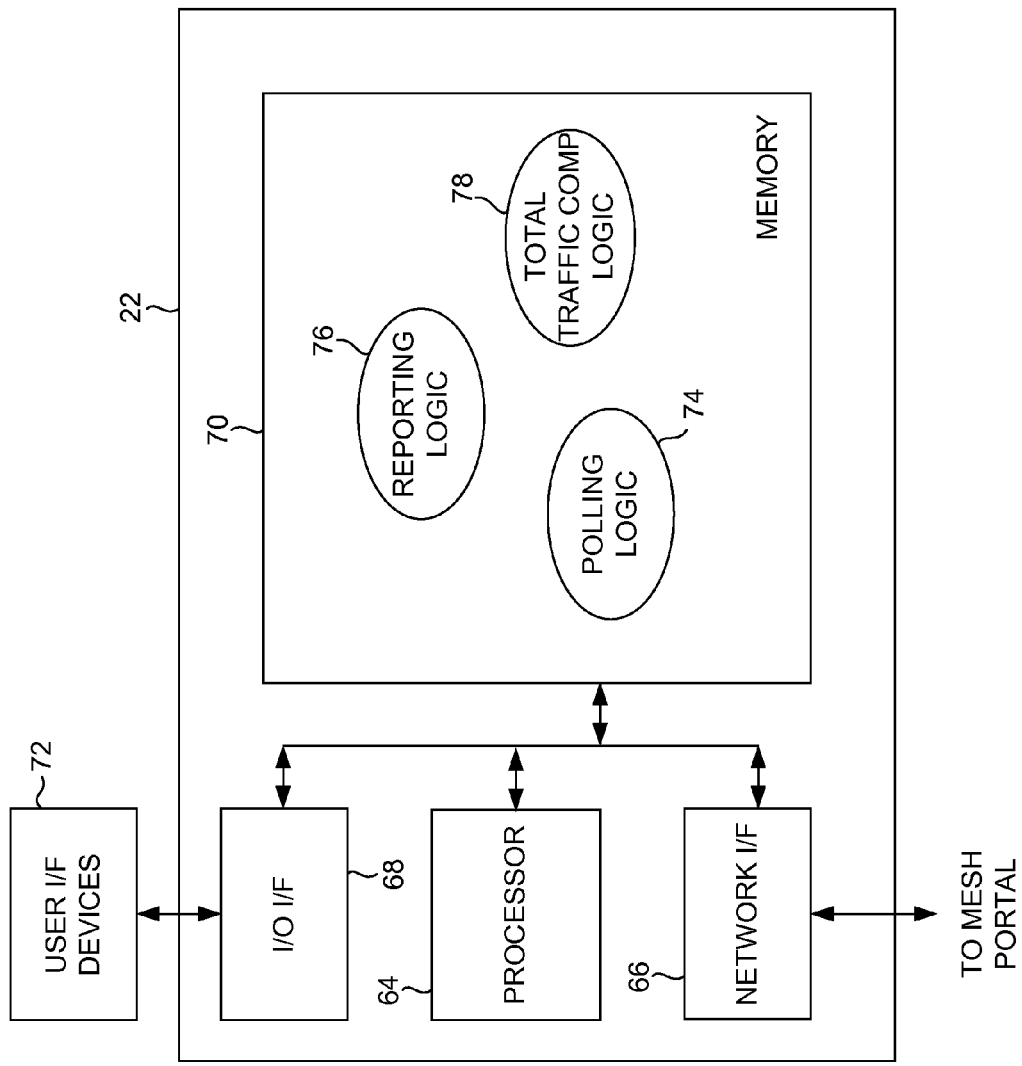
FIG. 3 is a block diagram of an exemplary controller device in the wireless mesh network of FIG. 1.

As illustrated in FIG. 3, controller 22 can include a processor 64, a network interface 66, an input/output (I/O) interface 68, and a memory 70. In addition to these elements, controller 22 can include any other suitable elements commonly included in conventional wireless mesh network controllers. However, as the above-referenced elements are most directly related to the operation of the exemplary embodiment of the invention, only the above-referenced elements of controller 22 are shown and described herein for purposes of clarity. Conventional elements, including some conventional logic, of controller 22 are not shown or described herein, as they are well understood by persons skilled in the art. User interface devices 72, such as a monitor, keyboard, mouse, printer, etc., can be connected to I/O interface 68.

Controller 22 can include the following logic elements: polling logic 74, reporting logic 76, and total traffic computation logic 78. Although the foregoing logic elements are shown in FIG. 3 in a conceptual manner as stored in or residing in memory 70, persons skilled in the art understand that such logic elements arise through the operation of processor 64 and may not be present simultaneously or in their entireties in memory 70. Software or firmware contributes to programming or configuring the processing system, comprising processor 64 and memory 70, with such logic elements. In view of the descriptions herein, persons skilled in the art are capable of providing such software or firmware or otherwise configuring controller 22. Although memory 70 is depicted as a single or unitary element, memory 70 can be of any suitable type and can have any suitable structure, such as one or more modules, chips, etc. Memory 70 can be, for example, a non-volatile type such as flash memory. Such software or firmware can be stored or otherwise embodied in any suitable non-transitory medium, including any suitable type of memory, and operated upon in memory 70 or other data storage medium in accordance with well-known computing principles. Such software or firmware can be loaded into memory 70 or other memory (not shown) in any suitable manner, such as during a configuration procedure preceding the method of operation described above. It should also be understood that although in the exemplary system embodiment the above-referenced logic elements are associated with controller 22, in other system embodiments such logic elements can be distributed among two or more devices, such as multiple controllers, or a controller and an AP.

It should be understood that the combination of memory 70 and the above-referenced logic elements or software, firmware, instructions, etc., underlying the logic elements, as stored in memory 70 in non-transitory computer-readable form, defines a "computer program product" as that term is understood in the patent lexicon. In view of the descriptions herein, persons skilled in the art will readily be capable of providing suitable software or firmware or otherwise configuring controller 22 to operate in the manner described. Also, although the effect of each of the above-referenced logic elements is described herein, it should be understood that the effect may result from contributions of two or more logic elements, or from contributions of the logic elements and conventional wireless mesh network controller logic elements or other network features that are not shown for purposes of clarity.

Polling logic 74 contributes to the configuring of controller 22 to poll each of APs 12-18. Each poll or request is communicated to one of APs 12-18 through wireless mesh network 10. In response to the poll, controller 22 receives information indicating reportable traffic from each of APs 12-18. As described above with regard to the exemplary method, reportable traffic at one of APs 12-18 can include incoming mesh traffic, outgoing mesh traffic, incoming client traffic, and outgoing client traffic. Total traffic computation logic 78 contributes to the configuring of controller 22 to add or sum the reportable incoming mesh traffic measurements and reportable outgoing mesh traffic measurements to produce total reportable incoming mesh traffic and total reportable outgoing mesh traffic measurements, respectively. Reporting logic 76 contributes to the configuring of controller 22 to generate and output a report via user interface devices 72.

Figure 4:
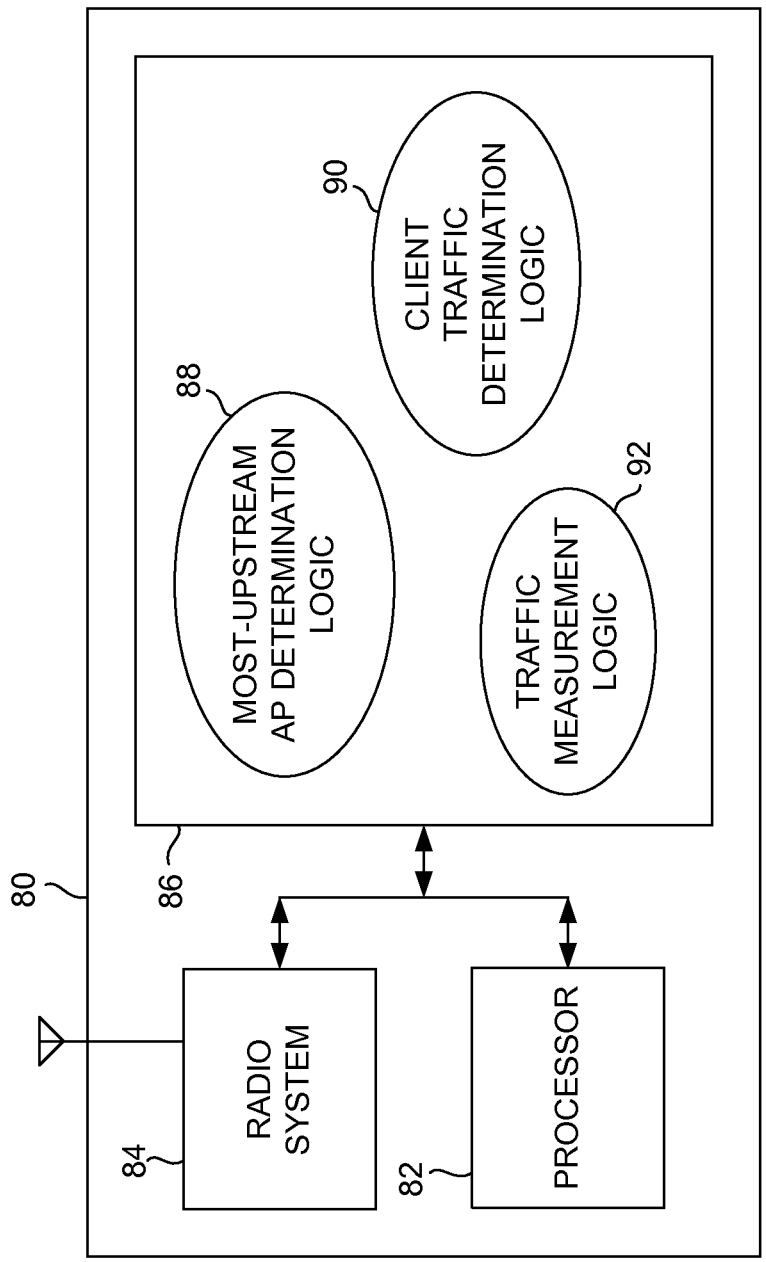
FIG. 4 is a block diagram of an exemplary wireless mesh access point in the wireless mesh network of FIG. 1.

An exemplary AP 80 is shown in FIG. 4. Exemplary AP 80 can be any of APs 14, 16 or 18 and, with the addition of a wired link (not shown) can be portal AP 12. As illustrated in FIG. 4, exemplary AP 80 can include a processor 82, a radio system 84, and a memory 86. In addition to these elements, exemplary AP 80 can include any other suitable elements commonly included in conventional wireless mesh access points. However, as the above-referenced elements are most directly related to the operation of the exemplary embodiment of the invention, only these elements of exemplary AP 80 are shown and described herein for purposes of clarity. Conventional elements, including some conventional logic, of exemplary AP 80 are not shown or described herein, as they are well understood by persons skilled in the art. As well understood in the art, radio system 84, under control of processor 82, is configured to establish the above-referenced wireless communication links with peers.

Exemplary AP 80 includes the following logic elements: most-upstream AP determination logic 88, client traffic determination logic 90, and traffic measurement logic 92. Although the foregoing logic elements are shown in FIG. 4 in a conceptual manner as stored in or residing in memory 86, persons skilled in the art understand that such logic elements arise through the operation of processor 82 and may not be present simultaneously or in their entireties in memory 86. Such software or firmware contributes to programming or configuring the processing system, comprising processor 82 and memory 86, with such logic elements. Although memory 86 is depicted as a single or unitary element, memory 86 can be of any suitable type and can have any suitable structure, such as one or more modules, chips, etc. Memory 86 can be, for example, a non-volatile type such as flash memory. Such software or firmware can be stored or otherwise embodied in any suitable non-transitory medium, including any suitable type of memory, and operated upon in memory 86 or other data storage medium in accordance with well-known computing principles. Such software or firmware can be loaded into memory 86 or other memory (not shown) in any suitable manner, such as during a configuration procedure preceding the method of operation described above.

It should be understood that the combination of memory 86 and the above-referenced logic elements or software, firmware, instructions, etc., underlying the logic elements, as stored in memory 86 in non-transitory computer-readable form, defines a "computer program product" as that term is understood in the patent lexicon. In view of the descriptions herein, persons skilled in the art will readily be capable of providing suitable software or firmware or otherwise configuring exemplary AP 80 to operate in the manner described. Also, although the effect of each of the above-referenced logic elements is described herein, it should be understood that the effect may result from contributions of two or more logic elements, or from contributions of the logic elements and conventional wireless mesh access point logic elements or other network features that are not shown for purposes of clarity.

Most-upstream AP determination logic 88 contributes to the configuring of exemplary AP 80 to determine whether exemplary AP 80 is the most upstream AP for each traffic flow at exemplary AP 80. Most-upstream AP determination logic 88 can communicate with conventional logic (not shown) that is involved in establishing and maintaining communication links. As such conventional logic is well understood in the art, it is not described herein. Client traffic determination logic 90 contributes to the configuring of exemplary AP 80 to determine whether each traffic flow at exemplary AP 80 is incoming from a client, outgoing to a client, or neither. Traffic measurement logic 92 contributes to the configuring of exemplary AP 80 to measure each traffic flow at exemplary AP 80. Most-upstream AP determination logic 88, client traffic determination logic 90, and traffic measurement logic 92 can operate in response to the above-described poll communication received from controller 22 or, alternatively, can operate in response to any other suitable event or condition. For example, such logic elements can operate on a periodic basis, generating and maintaining traffic flow information in anticipation of being polled by controller 22.

An example of a report 100 that controller 22 can generate is illustrated in FIG. 5. Such a report 100 can, for example, list in tabular format the name of each AP and the categories of traffic. In report 100, the AP names appear as table row headings: the name of portal AP 12 appears as a "Portal AP 12"; the name of AP 14 appears as "Mesh AP 14"; the name of AP 16 appears as "Mesh AP 16"; and the name of AP 18 appears as "Mesh AP 18". In report 100, the categories of "incoming mesh traffic," "outgoing mesh traffic," "incoming client traffic," and "outgoing client traffic" appear as table column headings. Note that in the exemplary embodiment only the mesh traffic described above as being "reportable" or "reported" appears in report 100. Accordingly, report 100 indicates that AP 12 has incoming mesh traffic in the amount of the above-described first traffic flow and outgoing mesh traffic in the amount of the above-described second traffic flow. These amounts would appear to a user of report 100 as numerical values, but are respectively indicated in FIG. 5 by "(1ST FLOW)" and "(2ND FLOW)" for explanatory purposes. As described above, the first traffic flow is represented by each of arrows 26A and 26B in FIG. 1, and the second traffic flow is represented by each of arrows 30A, 30B and 30C in FIG. 1. Report 100 further indicates that AP 14 has incoming client traffic in the amount of the above-described first traffic flow. Note that report 100 does not indicate any mesh traffic at AP 14 because, in the exemplary embodiment, the mesh traffic at AP 14 is not reportable mesh traffic. Report 100 also indicates that AP 16 has incoming mesh traffic in the amount of the above-described third traffic flow, outgoing mesh traffic in the amount of the third traffic flow, and outgoing client traffic in the amount of the third traffic flow. As described above, the third traffic flow is represented by each of arrows 34A, 34B and 34C in FIG. 1. Report 100 still further indicates that AP 18 has incoming client traffic in the amount of the third traffic flow and outgoing client traffic in the amount of the third traffic flow. Note that report 100 does not indicate any mesh traffic at AP 18 because, in the exemplary embodiment, the mesh traffic at AP 18 is not reportable mesh traffic.

In addition, report 100 indicates that the total incoming mesh traffic is the sum of the first traffic flow and the third traffic flow, and the total outgoing mesh traffic is the sum of the second traffic flow and the third traffic flow. Note that these sums would appear to a user of report 100 as numerical values, but are respectively indicated in FIG. 5 by "(1ST FLOW+3RD FLOW)" and "(2ND FLOW+3RD FLOW)" for explanatory purposes. By summing only the "reportable" mesh traffic in network 10, report 100 can present a more meaningful overview of the total traffic in network 10 to a system administrator than a report generated by alternative methods.

Controller 22 can output report 100 via user interface devices 72, such as a monitor or printer, so that a system administrator or other personnel can review report 100. Alternatively, report 100 can be stored in a suitable data storage device (not shown), transmitted via the Internet or other data network, or utilized in any other suitable manner.

The format of report 100 shown in FIG. 5 is intended only as an example. Alternatively, such a report can have any other suitable format and be generated in response to any suitable user input. A system administrator or other user can instruct controller 22 via a suitable user interface to output more information or less information than the information shown in report 100 or to filter the information in a user-specified manner. For example, controller 22 can be instructed to report traffic for only those APs that are downstream of a user-specified AP. In addition, controller 22 can be instructed to display not only the mesh traffic described above as being "reportable" or "reported" but all mesh traffic for each AP.

One or more illustrative or exemplary embodiments of the invention have been described above. However, it is to be understood that the invention is defined by the appended claims and is not limited to the specific embodiments described.

What is claimed is:

1. A method for determining traffic in a wireless mesh network, comprising:
   determining whether each of a plurality of APs in the wireless mesh network is a most upstream AP for a traffic flow in the wireless mesh network; and
   electronically outputting in user-perceptible form an indication of an amount of traffic flow through each wireless mesh AP determined to be the most upstream wireless mesh AP for one of a plurality of traffic flows.

2. The method of claim 1, further comprising determining a device type of a second wireless mesh network device downstream of a first wireless mesh network device by comparing an address of a first wireless mesh network device with an address of the second wireless mesh network device.

3. The method of claim 2, wherein determining a device type of a second wireless mesh network device comprises comparing Organizationally Unique Identifier (OUI) bits of a media access control (MAC) address of the first wireless mesh network device with the OUI bits of the MAC address of the second wireless mesh network device.

4. The method of claim 1, wherein electronically outputting in user-perceptible form an indication of an amount of traffic flow comprises providing an incoming traffic measurement and an outgoing traffic measurement.

5. The method of claim 1, further comprising summing a plurality of traffic indications to electronically output in user-perceptible form a total traffic indication for the wireless mesh network.

6. The method of claim 5, wherein:
electronically outputting in user-perceptible form an indication of an amount of traffic flow comprises providing an incoming traffic indication and an outgoing traffic indication; and
summing a plurality of traffic indications to electronically output in user-perceptible form a total traffic indication for the wireless mesh network comprises summing a plurality of incoming traffic indications to provide a total incoming traffic indication and summing a plurality of outgoing traffic indications to provide a total outgoing traffic indication.

7. A system, comprising:
network interface configured to communicate with at least one wireless mesh access point (AP) of a wireless mesh network; and
a processing system comprising a processor and memory, the processing system configured to include:
most upstream AP determination logic configured to determine whether each of a plurality of APs in the wireless mesh network is a most upstream AP for a traffic flow; and
indication logic configured to output in user-perceptible form a traffic flow indication indicating an amount of traffic flow through each wireless mesh AP determined to be the most upstream wireless mesh AP for one of a plurality of traffic flows.

8. The system of claim 7, further comprising client traffic determination logic configured to determine a device type of a second wireless mesh network device downstream of a first wireless mesh network device by comparing an address of a first wireless mesh network device with an address of the second wireless mesh network device.

9. The system of claim 8, wherein the client traffic determination logic is configured to compare Organizationally Unique Identifier (OUI) bits of a media access control (MAC) address of the first wireless mesh network device with the OUI bits of the MAC address of the second wireless mesh network device.

10. The system of claim 7, wherein the indication logic is configured to output in user-perceptible form a traffic flow indication by providing an incoming traffic flow indication and an outgoing traffic flow indication.

11. The system of claim 7, further comprising summation logic configured to sum a plurality of traffic flow indications to output in user-perceptible form a total traffic flow indication for the wireless mesh network.

12. The system of claim 11, wherein:
the indication logic is configured to output in user-perceptible form an incoming traffic flow indication and an outgoing traffic flow indication; and
the summation logic is configured to sum a plurality of incoming traffic flow indications to provide a total incoming traffic flow indication and sum a plurality of outgoing traffic flow indications to provide a total outgoing traffic indication.

13. A computer program product for determining traffic in a wireless mesh network, the computer program product comprising one or more computer-readable instructions stored in non-transitory computer-readable form on one or more computer-readable media that when executed by one or more processing systems control a method comprising:
determining whether each of a plurality of APs in the wireless mesh network is a most upstream AP for a traffic flow in the wireless mesh network; and
electronically outputting in user-perceptible form an indication of an amount of traffic flow through each wireless mesh AP determined to be the most upstream wireless mesh AP for one of a plurality of traffic flows.

14. The computer program product of claim 13, further comprising determining a device type of a second wireless mesh network device downstream of a first wireless mesh network device by comparing an address of a first wireless mesh network device with an address of the second wireless mesh network device.

15. The computer program product of claim 14, wherein determining a device type of the second wireless mesh network device comprises comparing Organizationally Unique Identifier (OUI) bits of a media access control (MAC) address of the first wireless mesh network device with the OUI bits of the MAC address of the second wireless mesh network device.

16. The computer program product of claim 13, wherein electronically outputting in user-perceptible form an indication of an amount of traffic flow comprises providing an incoming traffic measurement and an outgoing traffic measurement.

17. The computer program product of claim 13, wherein the method further comprises summing a plurality of traffic indications to electronically output in user-perceptible form an indication of a total traffic indication for the wireless mesh network.

18. The computer program product of claim 17, wherein:
electronically outputting in user-perceptible form an amount of traffic flow comprises providing an incoming traffic indication and an outgoing traffic indication; and
summing a plurality of traffic indications to provide a total traffic indication for the wireless mesh network comprises summing a plurality of incoming traffic indications to provide a total incoming traffic indication and summing a plurality of outgoing traffic indications to provide a total outgoing traffic indication.

* * * * *